2,977,379
Patented Mar. 28, 1961

2,977,379

OXYALKYLATED ORGANO-TIN CARBOXYLATES

Christoph Dorfelt, Altotting, and Kurt Hartel and Eugen Reindl, Burgkirchen, Germany, assignors to Farbwerke Hoechst Aktiengesellschaft vormals Meister Lucius & Bruning, Frankfurt am Main Hochst, Germany, a German company No Drawing. Filed Dec. 27, 1956, Ser. No. 630,756

Claims priority, application Germany Dec. 31, 1955

7 Claims. (Cl. 260—429.7)

The present invention relates to organic compounds of tin having a relatively low tin content and to a process for their preparation.

There are known organic compounds of tin wherein up to four equal or different organic radicals are bound to a central tetravalent tin atom which compounds are used for various technical applications. However, the application of these substances is limited in that they are rather expensive due to the high content of tin amounting in most cases to over 20 percent by weight.

Now, we have found that new and less expensive organic compounds of tin can be prepared by reacting per mol of the organic compounds of tin of the general formula:

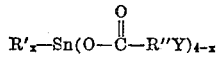

wherein R' and R" represent an acyclic aliphatic radical of 1–6 carbon atoms, a phenyl or cyclohexyl group $x$ represents an integer from 1 to 3, and Y represents

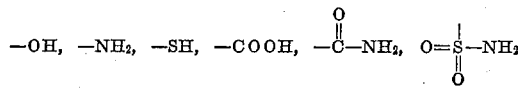

or

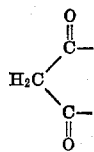

with up to 50 mols of an alkylene oxide, especially ethylene oxide. The increase of the size of the molecules is preferably continued up to a tin content of about 4 percent by weight.

In this reaction with an alkylene oxide, mixtures of compounds of high molecular weight are formed, the polyglycol chains of which have different lengths, and wherein the number of the single links which form the chains varies between 1–50. The length of the respective chains cannot be defined. It is possible, however, to determine the total content of alkylene oxide in the respective reaction product which content results from the increase in weight of the polyoxyalkylated product.

In addition to ethylene oxide, propylene oxide or a mixture of ethylene oxide and propylene oxide are also qualified for the above mentioned reaction.

The new compounds of high molecular weight which are poor in tin possess for most of the applications the same properties and the same effect as the known organic compounds of tin of low molecular weight. This fact is surprising since it was hitherto assumed that the properties of the organic compounds of tin, for example the insecticide effect, were due to their high tin content.

An especially advantageous way for preparing organic compounds of tin of high molecular weight according to this invention consists in introducing at the tin atom one or several radicals containing reactive and mobile hydrogen atoms and then oxyalkylating these intermediate products. This oxyalkylation can be performed without any decomposition taking place. This fact was not to be foreseen because, according to experience, the linkages between tin and carbon or other atoms are relatively easy to split.

As radicals having mobile and reactive hydrogen atoms which can be linked to the tin atom, there may primarily be mentioned those containing OH groups. Instead of, or in addition to, the OH groups there may be used as reactive radicals

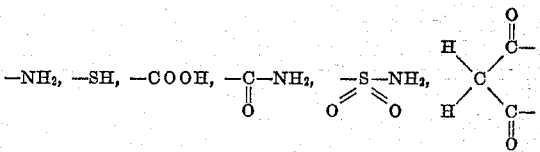

Groups of this kind can be introduced into an organic tin molecule in various ways. A simple way consists in reacting alkyl, aryl, aralkyl or cycloalkyl tin halides with the alkali metal salts of hydroxy acids, amino acids or mercapto acids. Among others, there may be prepared in a simple manner from tributyl tin chloride and sodium salicylate the tributyl tin salicylate, the free OH group of which is subsequently oxyalkylated. Instead of the sodium salicylate, there may be used salts of other hydroxy acids such as p-hydroxybenzoic acid, glycolic acid or lactic acid. Also, salts of acids containing amino groups may be used, such as glycocoll, alanine, o- and p-amino-benzoic acid or of mercapto acids such as thioglycolic acid or thiosalicylic acid.

The linkage of the radicals capable of being oxyalkylated to the tin atom can take place by means of a carboxyl group or in any other manner by means of an oxygen, a sulfur or a nitrogen bridge. It may also be prepared from a direct tin carbon compound as for example in the case of triphenyl-β-hydroxy-ethyl-tin $(C_6H_5)_3$—$SnCH_2$—$CH_2OH$.

Of course, there may be introduced side by side into the organic tin molecule also several similar or different radicals capable of being oxyalkylated, for example, two hydroxyl groups or one hydroxyl group and one amino group. During the oxyalkylation, there are then formed, according to the constitution of the starting tin compounds, polyglycolic ethers, polyglycolamines, polyglycolic thio-ethers, polyglycolic esters.

The oxyalkylation of the above mentioned intermediate products is performed according to already known methods by reacting the components preferably at elevated temperature and in the presence of catalysts such as sodium alcoholate, sodium or potassium hydroxide or tin tetrachloride. The absorption of the alkylene oxide is improved by the application of pressure. As oxyalkylating agents there may be used ethylene oxide, propylene oxide, butylene oxide or mixtures of ethylene oxide and propylene oxide.

The compounds of high molecular weight and poor in tin prepared by oxyalkylation are distinguished by their low price and also by the fact that with the increase of the degree of oxyalkylation they are increasingly better dispersed in water and may even become water-soluble. This property is especially significant for certain applications.

The new organic compounds of tin of high molecular weight and poor in tin are suitable for numerous industrial applications. They can serve, for example as preservatives for wood, leather, textile materials, paper and other substances which are exposed to the attack of fungi and bacteria. In these cases, the organic compounds of tin obtained by means of oxyalkylation are especially suitable due to the fact that they can be readily distributed in water. Furthermore, the new organic compounds of tin may be used, among others, as antioxidants in lubricants and textile materials, and also as stabilizers in plastics, for example, polyvinyl chloride.

The new organic compounds of tin of high molecular weight are also especially effective for the treatment of seed grain and living plants. In this case, they act on one hand fungicidally and bactericidally and on the other hand growth-promoting when applied in suitable concentrations. The latter effect may be made use of to obtain an increase of the crop of the cultures of plants as well as for the destruction of undesired vegetation (destruction of weed) by causing hypertropical growth.

The effect of the organic compounds of tin of high molecular weight and poor in tin prepared according to the present invention was examined by determination of the still effective minimum concentration. A dense suspension of spores of the test microbes was prepared in distilled water and the organic compound of tin to be examined was added in various concentrations. After an action of 24 and 28 hours, the percentage of the germinated spores was determined under a microscope.

The following table gives the effective amounts of various organic compounds of tin which are sufficient to kill in water 50 or 90 percent of the spores (LD 50 and LD 90).

In case the oxyethylation is continued until a tin content of 6 percent is obtained, the resulting product represents a waxy substance which dissolves in benzene to form a nearly clear solution, in acetone under formation of a slightly turbid solution, and which forms an emulsion-like dispersion in water.

Instead of tributyl tin salicylate, it is possible to prepare in an analogous manner the trihexyl tin salicylate from trihexyl tin chloride and sodium salicylate and then to react it with ethylene oxide. When oxyethylating to a content of tin of about 5 percent a waxy substance is obtained which is capable of forming an emulsion-like dispersion in water.

*Example 2*

34 grams of the finely powdered sodium salt of anthranilic acid (o-aminobenzoic acid) are suspended in 250 cc. of benzene, 65 grams of tributyl tin chloride are added and the mixture is heated for 2 hours to a temperature of 50° C., while stirring. The salt residue is filtered off with suction and the filtrate is freed from the benzene by distillation. The tributyl tin anthranilate is obtained in the form of a reddish oil which contains 28 percent of tin.

To 50 grams of this product is added 0.4 gram of sodium methylate and ethylene oxide is introduced at a temperature of 130–140° C. Subsequent to the absorp-

| organic compound of tin used | effective limit of concentration in parts/10$^{-6}$ | | | | | |
|---|---|---|---|---|---|---|
| | Alt. ten. | | Botryt. cyn. | | Sclerot. fruct. | |
| | LD 50 | LD 90 | LD 50 | LD 90 | LD 50 | LD 90 |
| tributyl-Sn-salicylo-polyglycolic ether 8.8% Sn | <0.2 | 0.2 | <0.2 | <0.2 | <0.2 | <0.2 |
| tributyl-Sn-salicylo-polyglycolic ether 6% Sn | <0.2 | 0.25 | <0.2 | <0.2 | <0.2 | <0.2 |
| tributyl-Sn-anthranilo-polyglycol-amine 13.4% Sn | <0.2 | 0.2 | <0.2 | <0.2 | <0.2 | <0.2 |
| tributyl-Sn-anthranilo-polyglycol-amine 7% Sn | <0.2 | 0.2 | <0.2 | <0.2 | <0.2 | <0.2 |
| tributyl-Sn-anthranilo-polyglycol-3.5% Sn | 0.5 | 1.0 | 0.2 | 0.5 | <0.2 | 0.25 |
| tributyl-Sn-salicylate 28% Sn | <0.2 | 0.2 | <0.2 | <0.2 | <0.2 | <0.12 |
| tributyl-Sn-anthranilate, 28% Sn | <0.2 | 0.2 | <0.2 | <0.2 | <0.2 | <0.2 |

The table displays the surprising fact that the new compounds of high molecular weight and poor in tin are equal in their sporicidal effect to compounds of low molecular weight rich in tin and that only in the case of tin content below 4 percent sometimes a decrease of the effect, as compared with the compounds rich in tin, can be observed.

The following examples serve to illustrate the invention but they are not intended to limit it thereto.

*Example 1*

41 grams of finely powdered sodium salicylate are stirred in 300 cc. of benzene, 78 grams of tributyl tin chloride are added and the mixture is boiled in a reflux apparatus, while stirring, for 4 hours. The alkali metal salt (sodium chloride and some sodium salicylate in excess) is separated by suction-filtration and the filtrate is freed of the benzene by distillation. The tributyl tin salicylate remains in the form of a pale oil which can be oxyalkylated without further purification. For this purpose, 50 grams of the product are mixed with 0.5 percent of sodium methylate. Ethylene oxide is then introduced through a frit at a temperature of 140–160° C. until an increase in weight of 108 grams is obtained. Whereas the starting material contained 28 percent of tin, the tin content subsequent to the oxyethylation amounts to only 8.8 percent.

The oxyethylated product represents a dark oil which dissolves in acetone and benzene and is capable of forming an emulsion-like dispersion in water.

tion of about 50 grams of ethylene oxide, there is obtained an organic tin compound of high molecular weight containing only 13.4 percent of tin. The new product is more viscous and darker than the corresponding product of Example 1. It dissolves in benzene and, with turbidity, in acetone.

In case the introduction of ethylene oxide is continued until a product containing 7 percent of tin is obtained, the resulting product represents, after cooling, a reddish wax which dissolves in benzene and acetone and which forms an emulsion-like dispersion in water.

If the oxyethylation is further continued to a content of about 3.5 percent tin, a rather hard brownish-red wax is obtained which dissolves in benzene with the formation of a clear solution, in acetone with a slight turbidity, and which yields with water at a corresponding dilution somewhat turbid solutions.

*Example 3*

Tributyl tin thioglycolate represents a pale oil containing 32 percent of tin and which has an excellent fungicidal effect against *Alternaria tenuis* and *Botrytis cynerea*.

In the case, there are added to this oil 0.5% of KOH and ethylene oxide is introduced at a temperature of 140–170° C. until the weight of the oil has doubled, a dark brown oil is obtained which still contains 16% of tin and which mainly consists of tributyl tin-thioglycolato-polyglycolic thio-ether. Its activity against *Alternaria tenuis* and *Botrytis cynerea* is equal to the activity of tributyl tin thioglycolate. In the case there is prepared—by further introducing ethylene oxide—an ether having a still higher molecular weight and containing 7% of tin, the product still shows a very good effect against *Alternaria tenuis*.

Example 4

Tributyl tin-p-amino-benzoate represents a dark oil containing 28% of tin and shows a very good fungicidal effect against *Alternaria tenuis* and *Botrytis cynerea*.

If, subsequent to the addition of 0.5% of sodium methylate as a catalyst, there is gradually introduced ethylene oxide into this oil, at a temperature of 150–160° C. two products can for example be obtained containing only 14 and 7% of tin respectively and mainly consisting of tributyl tin-p-amino-benzoato-polyglycol-amine.

For the above-mentioned fungi the product so obtained displays the same fungicidal effect as tributyl tin-p-aminobenzoate.

Example 5

Dibutyl-tin-dianthranilate melts at 114–115° C. and contains 23.2% of Sn. This product is melted, 0.4% of caustic soda is added and ethylene oxide is introduced at a temperature of 150–160° C. until the weight of the product has doubled. In this manner a golden-yellow oil is obtained which contains 11% of Sn and which consists essentially of dibutyl tin-dianthranilo-polyglycol-amine.

The product possesses a good fungicidal effect against *Alternaria tenuis* and *Botrytis cynerea*.

Dibutyl tin-dianthranilo-polyglycol-amine of higher molecular weight and containing 6% of tin and prepared by further introducing ethylene oxide shows the same effect.

We claim:

1. Products of the general formula $$R'_x-Sn(O-\overset{O}{\underset{\|}{C}}-R''Y)_{4-x}$$

wherein R′ and R″ represent a member selected from the group consisting of the phenyl radical, the cyclohexyl radical, and acyclic aliphatic hydrocarbon radicals having 1 to 6 carbon atoms, $x$ representing an integer from 1 to 3, and Y represents a chain of the formula $$(CH_2-CH_2O)_n-CH_2-CH_2-OH$$

linked to the radical R″ by means of an atom selected from the group consisting of oxygen, sulfur and nitrogen, the index $n$ representing an integer of 1 to 50.

2. Tributyl tin-salicylo-polyglycolic ether of the formula:

$$(C_4H_9)_3Sn-O-\overset{O}{\underset{\|}{C}}-\underset{}{\bigcirc}-O-(CH_2-CH_2-O)_n-CH_2CH_2OH$$

wherein $n$ corresponds to a tin content of the product of 6%.

3. Tributyl tin-anthranilo-dipolyglycol-amine of the formula:

$$(C_4H_9)_3Sn-O-\overset{O}{\underset{\|}{C}}-\underset{}{\bigcirc}-\overset{(CH_2-CH_2-O)_n-CH_2-CH_2OH}{\underset{}{N-(CH_2CH_2O)_n-CH_2CH_2OH}}$$

wherein $n$ corresponds to a tin content of the product of 7%.

4. Tributyl tin-thioglycolato-polyglycol thioether of the formula:

$$(C_4H_9)_3Sn-O-\overset{O}{\underset{\|}{C}}-CH_2-S-(CH_2-CH_2O)_n-CH_2-CH_2OH$$

wherein $n$ corresponds to a tin content of the product of 7%.

5. Tributyl tin-p-aminobenzoato-dipolyglycol-amine of the formula:

$$(C_4H_9)_3Sn-O-\overset{O}{\underset{\|}{C}}-\underset{}{\bigcirc}-\overset{(CH_2-CH_2O)_n-CH_2-CH_2OH}{\underset{}{N(CH_2-CH_2O)_n-CH_2-CH_2OH}}$$

wherein $n$ corresponds to a tin content of the product of 7%.

6. Dibutyl tin-bis-(anthranilo-dipolyglycol-amine) of the formula:

$$(C_4H_9)_2Sn\begin{Bmatrix}O-\overset{O}{\underset{\|}{C}}-\underset{}{\bigcirc}-N\overset{(CH_2CH_2O)_n-CH_2CH_2OH}{\underset{(CH_2-CH_2O)_n-CH_2-CH_2-OH}{}}\\O-\overset{O}{\underset{\|}{C}}-\underset{}{\bigcirc}-N\overset{(CH_2-CH_2O)_n-CH_2-CH_2OH}{\underset{(CH_2-CH_2O)_n-CH_2-CH_2OH}{}}\end{Bmatrix}$$

wherein $n$ corresponds to a tin content of the product of 6%.

7. A process for the preparation of new organic compounds of tin having high molecular weight and being poor in metal which comprises reacting an organic tin compound of the general formula $$R'_x-Sn(O-\overset{O}{\underset{\|}{C}}-R''Y)_{4-x}$$

wherein R′ and R″ represent a member selected from the group consisting of the phenyl radical, the cyclohexyl radical, and acyclic aliphatic hydrocarbon radicals having 1 to 6 carbon atoms, $x$ representing an integer from 1 to 3 and Y represents a member selected from the group consisting of OH, NH₂ and SH, with up to 50 mols of an alkylene oxide selected from the group consisting of ethylene oxide, propylene oxide and mixtures of ethylene oxide and propylene oxide.

References Cited in the file of this patent

UNITED STATES PATENTS

| | | |
|---|---|---|
| 2,349,771 | Horst | May 23, 1944 |
| 2,715,111 | Weinberg | Aug. 9, 1955 |
| 2,789,994 | Ramsden | Apr. 23, 1957 |
| 2,858,325 | Weinberg | Oct. 28, 1958 |
| 2,901,393 | Mager | Aug. 25, 1959 |

OTHER REFERENCES

Gilman et al.: "J. Org. Chem." 15, 994–1002, #5 (1950).